(12) United States Patent
Ståhlberg et al.

(10) Patent No.: US 9,021,136 B2
(45) Date of Patent: Apr. 28, 2015

(54) DATA SYNCHRONISATION

(75) Inventors: Mika Ståhlberg, Espoo (FI); Mikko Hyppönen, Espoo (FI); Kimmo Kasslin, Espoo (FI); Antti Tikkanen, Espoo (FI); Jarno Niemelä, Espoo (FI); Jarkko Konola, Oulu (FI)

(73) Assignee: F-Secure Corporation, Helsinki (FI)

( * ) Notice: Subject to any disclaimer, the term of this patent is extended or adjusted under 35 U.S.C. 154(b) by 217 days.

(21) Appl. No.: 13/437,402

(22) Filed: Apr. 2, 2012

(65) Prior Publication Data

US 2013/0262706 A1 Oct. 3, 2013

(51) Int. Cl.
G06F 15/16 (2006.01)
H04L 9/12 (2006.01)
H04L 27/26 (2006.01)

(52) U.S. Cl.
CPC ............... *H04L 9/12* (2013.01); *H04L 27/2655* (2013.01)

(58) Field of Classification Search
USPC ........................................................ 709/248
See application file for complete search history.

(56) References Cited

U.S. PATENT DOCUMENTS

| | | | |
|---|---|---|---|
| 6,941,383 B1 * | 9/2005 | Getsin et al. .................. | 709/248 |
| 7,188,193 B1 * | 3/2007 | Getsin et al. .................. | 709/248 |
| 7,458,091 B1 * | 11/2008 | Getsin et al. .................... | 725/97 |
| 7,739,411 B2 * | 6/2010 | Messer et al. ................. | 709/248 |
| 7,787,489 B2 * | 8/2010 | Caulfield et al. .............. | 370/463 |
| 8,249,144 B2 * | 8/2012 | Gutman et al. .......... | 375/240.01 |
| 8,392,957 B2 * | 3/2013 | Holt et al. ...................... | 725/105 |
| 8,671,185 B2 * | 3/2014 | Gandhi et al. ................ | 709/224 |
| 2003/0204577 A1 * | 10/2003 | Videtich ....................... | 709/221 |
| 2007/0177571 A1 | 8/2007 | Caulfield et al. | |
| 2007/0192512 A1 * | 8/2007 | Kwon et al. ................... | 709/248 |
| 2007/0250645 A1 * | 10/2007 | Meadows et al. ............. | 709/248 |
| 2008/0005358 A1 * | 1/2008 | Kwon et al. ................... | 709/248 |
| 2009/0187622 A1 * | 7/2009 | Xie ................................ | 709/203 |
| 2009/0300221 A1 * | 12/2009 | Gates et al. ................... | 709/248 |
| 2010/0161759 A1 | 6/2010 | Brand | |
| 2010/0299187 A1 * | 11/2010 | Duggal ......................... | 705/14.1 |
| 2011/0154255 A1 * | 6/2011 | Ryu et al. ...................... | 715/810 |
| 2012/0066303 A1 * | 3/2012 | Purdy ............................ | 709/204 |
| 2012/0221639 A1 * | 8/2012 | Mallet et al. .................. | 709/204 |
| 2013/0262706 A1 * | 10/2013 | Stahlberg et al. ............. | 709/248 |

* cited by examiner

*Primary Examiner* — Michael Y Won
(74) *Attorney, Agent, or Firm* — Harrington & Smith

(57) ABSTRACT

The present invention relates to a method for synchronizing files between devices between two devices. The method includes creating a rule to control the synchronization of the file. The rule includes at least one condition for synchronization which is dependent upon a property of a device.

15 Claims, 2 Drawing Sheets

DATA SYNCHRONISATION

TECHNICAL FIELD

The present invention provides a method for synchronising data between devices particularly, although not necessarily, file synchronisation on a mobile device

BACKGROUND

It is common for users to access user data using multiple devices such as a desktop personal computer (PC), laptop, tablet or mobile phone. Individual copies of the user files may be stored on a plurality of these devices. In order for there to be consistency between the copies of the files on each of the devices it is common to use file synchronisation techniques to synchronise copies of the files on different user devices.

Various known systems enable synchronisation of files between the different devices associated with a user. In this way, for example, files added to, or modified on, one device can be transferred to another device owned by the same user so that the user can access the latest versions of those files on any device. Known file synchronisation systems can generally be characterised into two types: file synchronisation systems and "cloud-based" systems.

File synchronisation systems require a local connection, either wired (e.g. using a USB cable) or wireless (e.g. using a Bluetooth interface), to be established between two devices allowing files to be directly transferred between the two devices. In contrast, in "cloud-based" systems the user's files are stored on a networked data storage in the internet and any updates to files are automatically uploaded to the networked data storage and distributed by the networked data storage to the appropriate user devices. Synchronisation of the data is preferably controlled by the networked data storage.

As will be noted many client devices, such as laptops, tablets and mobile phones, are portable. This may mean that there situations may arise where a user does not want a file that is synchronised with the networked data storage to be present on one or more of the devices. Currently, if a user does not wish a file to be present on a device then the user has to manually remove the file data from the device. If the user wishes to restore the file to the device then they will also have to restore the file manually to the device. This can be time consuming for file especially where a user needs to repeatedly remove and restore it to a device.

SUMMARY

In accordance with an aspect of the present invention there is provided a method of controlling synchronisation of data between a first device and a second device. The method includes determining a property of the first device, consulting a synchronisation rule to the synchronisation, the synchronisation rule including at least one condition dependent upon the property of the first device; and controlling synchronisation of the data between the first device and the second device in accordance with the synchronisation rule. By controlling the synchronisation of data with a device according to a property of the device it is possible to automatically alter the availability/properties of the data on the device thereby reducing the amount of manual intervention required.

Optionally, the second device may include a memory including one or more synchronisation rules. Such a second device may be configured to determine that the synchronisation rule includes a condition dependent on a property of the first device, and when synchronisation is due to take place, the second device transmits the synchronisation rule to the first device. The synchronisation device is then able to apply the synchronisation rule in order that the step of synchronising the data is in accordance with the synchronisation rule.

Alternatively, a second device including a memory including one or more synchronisation rules may be configured to receive a property of the first device from the first device after the first device has determined the property. The second device can then consult the synchronisation rule and control synchronisation of the data according to the synchronisation rule.

In a further option the second device including a memory including one or more synchronisation rules, determines the property of the first device and controls synchronisation of the data with the first device according to the synchronisation rule and the determined property.

The property may be a location of the first device, a status of the first device, a time at the first device or a connection to a third device. Where the property is a location of the first device the location may be determined by the first device or the second device using one or more of: determining a GPS co-ordinate using a GPS receiver at the first device, determining the network operator that the first device is connected to, determining an SSID of a WiFi network visible to the first device and determining the first device's public IP address.

The synchronisation of data may cause the data to be removed from the first device, restored to the first device, encrypted on the first device, or decrypted on the first device.

The data may be an audio file, a video file, a text file, an image file, a folder containing one or more files. Alternatively the synchronisation rule may be applied for any data that the first device synchronises with the second device.

The first device may be a mobile device or fixed device. The second device may be a networked data storage.

In accordance with another aspect of the present invention there is provided a device comprising a memory including data to be synchronised with another device, a processor to determine a property of the device, an input to receive a synchronisation rule including at least one condition dependent upon the property of the first device, the device applying the synchronisation rule to control synchronisation of the data with the another device in accordance with the synchronisation rule.

In accordance with a further aspect of the present invention there is provided a computer program stored on a computer readable medium which, when executed on a device having a memory including data causes the device to determine a property of the device and, upon receiving a synchronisation rule including at least one condition dependent upon the property of the first device, apply the synchronisation rule to control synchronisation of the data with the another device in accordance with the synchronisation rule.

In accordance with yet another aspect of the present invention there is provided a device comprising a memory including data to be synchronised with another device, the data being associated with a synchronisation rule including at least one condition dependent upon the property of the another device, an input to receive a property of the another device, and a processor configured to apply the synchronisation rule to control synchronisation of the data with the another device in accordance with the synchronisation rule.

In accordance with another aspect of the present invention there is provided a computer program stored on a computer readable medium which, when executed on a device, the device having a memory including data associated with a synchronisation rule including at least one condition dependent upon the property of the another device, causes the device to, upon receiving a property of the another device, apply the synchronisation rule to control synchronisation of the data with the another device in accordance with the synchronisation rule.

DESCRIPTION

Figure 1:
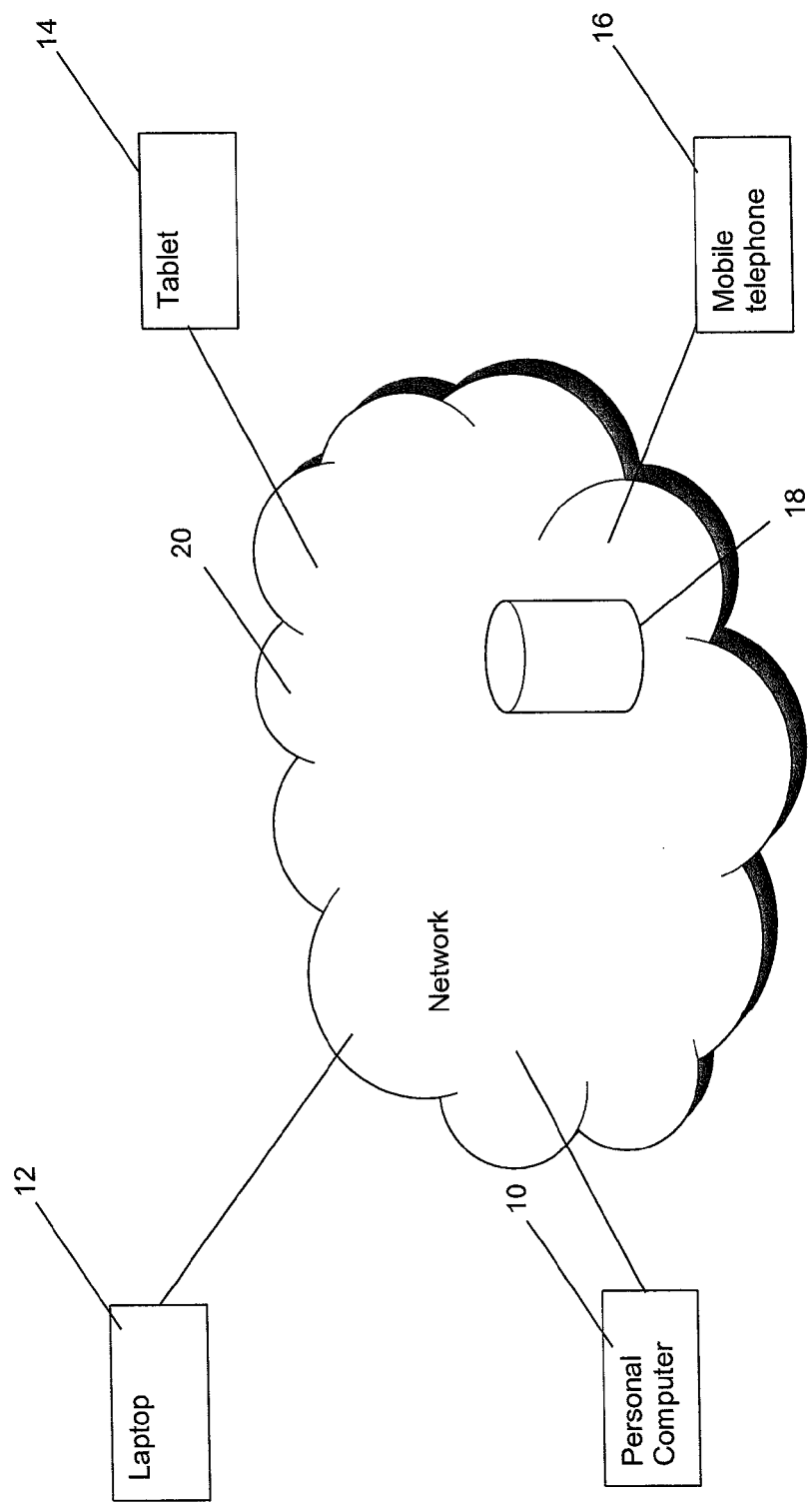
FIG. 1 illustrates a network including multiple client devices.

As illustrated in FIG. 1 a user has a number of devices such as a desktop personal computer (PC) 10, laptop 12, tablet 14 or mobile phone 16 on which a copy of a file is stored. The file is also stored on a networked data storage 18 which acts as the source and with which all the devices connect through a network connection over the internet 20 to synchronise the file.

Synchronisation of the file between the networked data storage and the devices is controlled by one or more synchronisation rules in the networked data storage.

Figure 2:
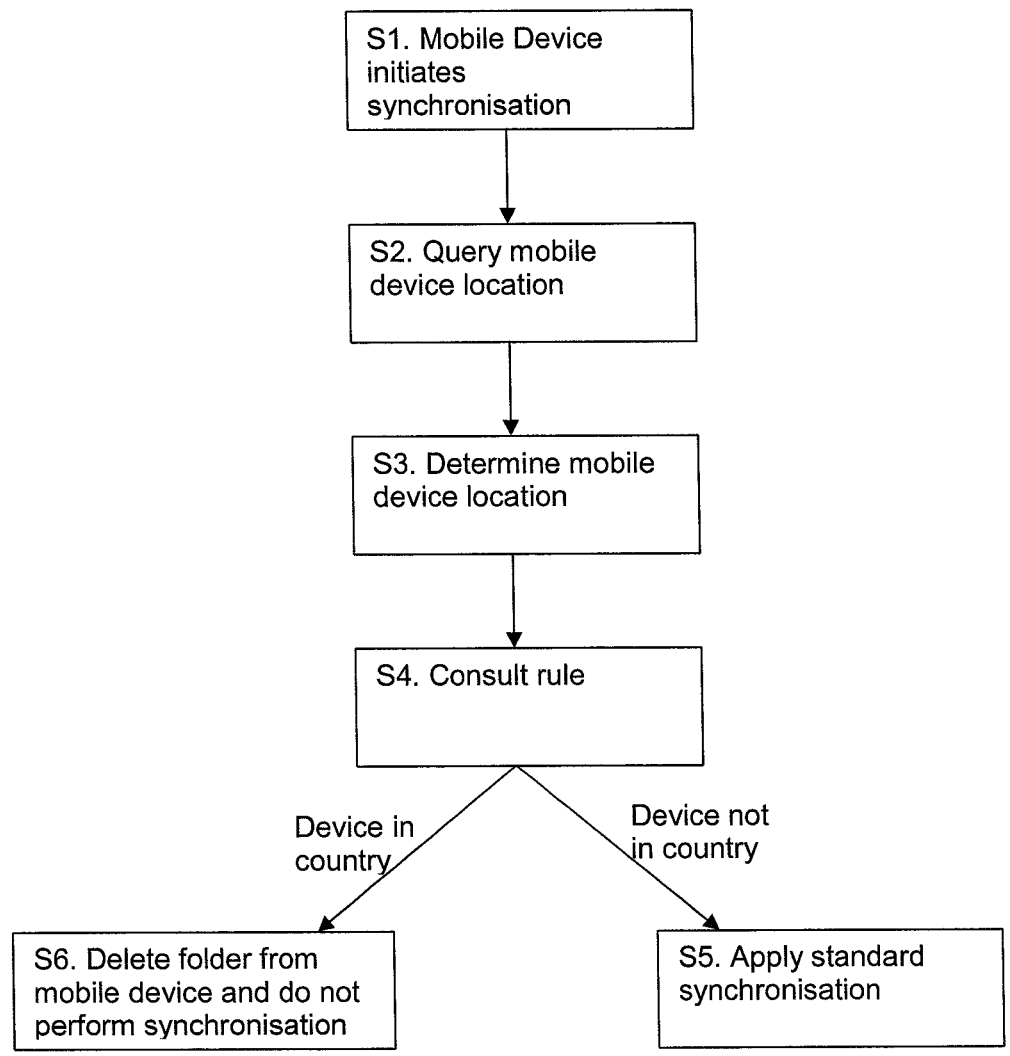
FIG. 2 is a flow diagram of a method of file synchronisation according to an embodiment of the present invention.

An embodiment of the present invention will now be described with reference to FIG. 2. This embodiment will be described with reference to a networked data storage which includes a file system including a file and a synchronisation rule associated with the file and a mobile device which also includes a file system including the file.

The synchronisation rule stored in the networked data storage includes the condition that if the mobile device is present in a country the contents of the file are to be removed from the device and the data is not to be synchronised with the device whilst the device is in that country. The synchronisation rule also includes the condition that when the mobile device is not in the country the file is to be synchronised between the networked data storage and the mobile device.

When the mobile device synchronises its file system with the file system of the networked data storage, for example, when the mobile device is turned on or after a predetermined amount of time the following steps are performed:

S1: the mobile device initiates synchronisation with the networked data storage

S2: the networked data storage queries the mobile device for its location

S3: the mobile device determines its location and returns this to the networked data storage S4: the networked data storage then consults the rule using the location of the mobile device to determine which condition is satisfied S5: if the device is not in the country then synchronisation of the file between the networked data storage and the mobile device proceeds as normal S6: if the device is in the country identified in the rule then the networked data storage does not allow synchronisation of the files on the networked data storage and the mobile device to occur. Additionally, it forwards an instruction to the mobile device to delete the file from its memory.

By controlling synchronisation of files on mobile devices in this way files can be automatically removed from and restored to devices upon synchronisation and may be of use, for example, to remove data such as adult material which is legal in some countries but not in others from a mobile device.

In another embodiment of the invention the networked data storage may determine that the synchronisation of a file is dependent upon the location of the mobile device and, transmit the synchronisation rule including the location condition to the mobile device when synchronisation is initiated. The mobile device then, rather than transmitting location information to the networked data storage, determines its location and causes synchronisation of the file dependent upon its location.

A rule in accordance with either of the above embodiments may not be for only one country but may include a plurality of countries. The countries associated with the rule may be a predetermined list associated with a predefined rule which the user can associate with one or more files in the file systems. Alternatively, the user may, when associating a file with the rule or at any other point, manually select the countries to be placed on the list or alter a predetermined list associated with the rule.

As will be understood by the skilled person, the use of such a rule is not limited to a country but may be any suitable geographical location. For example, the geographical location may be a town, city, state or postal code. Furthermore, the location may be defined as being an area defined by a distance from a specific location. For example, the category may cause the data to be deleted from the device if the device is not within 100 km of Turku and restored to the device when the device is within that area.

The location of the device may be determined using any suitable means. For example, the device may detect its location using an inbuilt GPS receiver, detecting the name of the operator of the network it is connecting to the internet using accessing (for example if the device is a cellular telephone), from the visible SSIDs of WIFi networks, from the public IP address obtained for the device using DHCP or from the carrier id of the network to which the device connects e.g. a GSM/3G/4G carrier.

Optionally, the rule may enable a user to select a location prior to entering the location. For example, the user may select the USA if they are about to board a flight to the USA. This rule causes the device to apply the synchronisation rules specified for that location prior to entering the location. Optionally, the selection of a location by a user when they are not located in the location may cause the device to apply alternative or additional rules. For example, in addition to applying the synchronisation rules for the location, the device may apply additional rules such synchronisation rules causing the removal of any "business" data from the device. Business data may be restored to the device when it performs a particular action, for example, when a call is made from the device or the device connects to a WiFi access point. Alternatively, the user may have to manually stop the application of the additional or alternative synchronisation rules.

The rule may not only be dependent upon location of the mobile device but may be dependent upon any other property of the mobile device. For example, the rule may be time dependent meaning that synchronisation of the folder occurs between predefined hours and the folder is removed from the mobile device outside of these hours. For example, in the case of work related data the rule may specify that the file is automatically removed from the device after 17:00 and restored to the device at 08:00 on weekdays in order that work files are not accessible outside working hours. The time specified in the rule may be any suitable time duration.

In yet another alternative the property of the device may be a status set for the device either at the device, at the networked data storage or any other suitable means. For example, the device may have the status options "normal", "maintenance", "stolen", "immigration" etc. . . . . The rule may be set up that when the device has the status normal then the file is synchronised with the networked data storage, the status "stolen"

causes the data to be automatically removed from the device and the status "immigration" causes any business sensitive information to be removed from the device.

Optionally a third party application may be configured to change the status of the device. For example, when a user enters an event in a calendar application on the device, the user may be prompted to include a status change which occurs at the start of the event. The status may relate to, for example, location of the device or maintenance. Advantageously the status of the device is altered to the original status when the event ends. Other third party applications may include a flight tracker application on the device.

In a further alternative the rule may be dependent upon the device having a connection to another device. For example, a mobile phone may be configured to connect to a laptop when the connection is available. The file has a synchronisation rule which specifies that the file is synchronised to the laptop when the mobile phone is connected to the laptop and deleted from the laptop when the mobile phone is no longer connected to the laptop. Currently, to access a file on a mobile phone a laptop user will not only have to connect the mobile phone to the laptop but will then have to navigate through the mobile phone file system to access the file. By having a synchronisation rule set up in this way the user can configure the system such that a file automatically becomes available on the laptop without requiring a user to navigate the mobile phone's file system.

In any of the above embodiments the rule may not only specify the presence or absence of a folder on a mobile device but may specify any other suitable condition of synchronisation. For example, the synchronisation rule may determine when a folder is in an encrypted or decrypted format on the device.

Although the present invention has been described with reference to a file it will be understood by the skilled person that the synchronisation rule may be associated with any type of user data. For example, the synchronisation rule may be associated with a folder containing files, an entire file system, an address book, one or more entries in an address book, a database such as an email or SMS database, or one or more entries in a database.

The instance where a synchronisation rule associated with an entire file system may be useful is if the device is stolen. For example, the synchronisation rule may specify that all of the content synchronised with the networked data storage is removed from the device if the device enters a country on a list of countries the user will never visit, the SSID "HomeNetwork" is not visible or when the device's status is set to stolen.

Although the present invention has been described with reference to single rules, synchronisation rules may be collected into groups of rules which can be collectively associated with a file or folder. For example, a category "adult material" may be provided. The user can then associate any appropriate files or folders with that category. By associating a file with the category "adult material" the file is automatically associated with any synchronisation rules for that category. Advantageously, when files are removed from the device any references to the existence of the files or the associated category is also removed from the device. Thus, there is no indication on the device of material associated with the category being present on the device.

As will be understood by the skilled person this invention may be applied not only to mobile devices but also to fixed devices.

The invention claimed is:

1. A method of controlling synchronisation of data between a first device and a second device comprising:

1) determining a property of the first device, the property being one of a location of the first device and a time at the location of the first device;
2) consulting a synchronisation rule associated with the data, the synchronisation rule including at least one condition dependent upon the property of the first device;
3) controlling synchronisation of the data between the first device and the second device in accordance with the synchronisation rule; and
4) identifying a change in said property and in response repeating steps 2) and 3);

wherein controlling synchronisation of the data is one or more of, causing the data to be removed from the first device, causing the data to be restored to the first device, causing the data to be encrypted on the first device, and causing the data to be decrypted on the first device; and wherein the data to be removed, restored, encrypted, or decrypted is dependent on one of the location of the first device and the time at the location of the first device.

2. The method of claim 1 wherein the second device includes a memory including one or more synchronisation rules, the method further comprising: the second device determining that the synchronisation rule includes a condition dependent on a property of the first device, the second device transmitting the synchronisation rule to the first device, the first device applying the synchronisation rule such that the step of synchronising the data is in accordance with the synchronisation rule.

3. The method of claim 1 wherein the second device includes a memory including one or more synchronisation rules, the method further comprising: the first device performing the step of determining the property, the first device transmitting the property to the second device and the second device performing the steps of consulting the synchronisation rule and controlling synchronisation of the data.

4. The method of claim 1 wherein the second device includes a memory including one or more synchronisation rules, and the second device performs the steps of determining the property of the first device, consulting the synchronisation rule and controlling synchronisation of the data.

5. The method of claim 1 wherein the property is a location of the first device and the location is determined by one or more of: determining a GPS co-ordinate using a GPS receiver at the first device, determining the network operator that the first device is connected to, determining an SSID of a WiFi network visible to the first device, determining the first device's public IP address and determining the carrier id of a network to which the device is connected.

6. The method of claim 1 wherein the data is one or more of: an audio file, a video file, a text file, an image file, a folder containing one or more files, an entry in an address book, an email, an SMS message.

7. The method of claim 1 wherein the first device is a mobile device and the second device is a networked data storage.

8. A device comprising:
a memory including data to be synchronised with another device;
a processor to determine a property of the device, the property being one of a location of the first device and a time at the location of the first device;
an input to receive a synchronisation rule including at least one condition dependent upon the property of the first device, the device applying the synchronisation rule to control synchronisation of the data with the another device in accordance with the synchronisation rule;

wherein controlling synchronisation of the data is one or more of, causing the data to be removed from the first device, causing the data to be restored to the first device, causing the data to be encrypted on the first device, and causing the data to be decrypted on the first device; and wherein the data to be removed, restored, encrypted, or decrypted is dependent on one of the location of the first device and the time at the location of the first device.

9. The device of claim 8 wherein the property is a location of the device and the location is determined by one or more of: determining a GPS co-ordinate using a GPS receiver at the device, determining the network operator that the device is connected to, determining an SSID of a WiFi network visible to the device, determining the device's public IP address and determining the carrier id of a network to which the device is connected.

10. The device of claim 1 wherein applying the synchronisation rule comprises one or more of the first device deleting the data, the device restoring the data, the device encrypting the data and the device decrypting the data.

11. A computer program stored on a non-transitory computer readable medium which, when executed on a device having a memory including data causes the device to (1) determine a property of the device, the property being one of a location of the first device and a time at the location of the first device, upon (2) receiving a synchronisation rule including at least one condition dependent upon the property of the first device, apply the synchronisation rule to control synchronisation of the data with the another device in accordance with the synchronisation rule, and (3) identify a change in said property and in response repeat step (2);

wherein controlling synchronisation of the data is one or more of, causing the data to be removed from the first device, causing the data to be restored to the first device, causing the data to be encrypted on the first device, and causing the data to be decrypted on the first device; and wherein the data to be removed, restored, encrypted, or decrypted is dependent on one of the location of the first device and the time at the location of the first device.

12. A device comprising:

a memory including data to be synchronised with another device, the data being associated with a synchronisation rule including at least one condition dependent upon the property of the another device;

an input to receive a property of the another device, the property being one of a location of the first device and a time at the location of the first device;

a processor configured to apply the synchronisation rule to control synchronisation of the data with the another device in accordance with the synchronisation rule, and to reapply the synchronisation rule to control synchronisation of the data with the another device when a changed property is received at said input;

wherein controlling synchronisation of the data is one or more of, causing the data to be removed from the first device, causing the data to be restored to the first device, causing the data to be encrypted on the first device, and causing the data to be decrypted on the first device; and wherein the data to be removed, restored, encrypted, or decrypted is dependent on one of the location of the first device and the time at the location of the first device.

13. The device of claim 12 wherein the property is a location of the another device and the input is configured to receive one of: a GPS co-ordinate for the another device, an identifier of the network operator to which the another device is connected, an SSID of a WiFi network visible to the first device, the another device's public IP address and determining the carrier id of a network to which the device is connected.

14. The device of claim 12, wherein the processor is configured to perform one or more of, causing the data to be removed from the device, causing the data to be restored to the device, causing the data to be encrypted on the device, causing the data to be decrypted on the device.

15. A computer program stored on a non-transitory computer readable medium which, when executed on a device, the device having a memory including data associated with a synchronisation rule including at least one condition dependent upon the property of the another device, the property being one of a location of the first device and a time at the location of the first device, causes the device to, upon receiving a property of the another device, apply the synchronisation rule to control synchronisation of the data with the another device in accordance with the synchronisation rule, and reapply the synchronisation rule to control synchronisation of the data with the another device when a changed property is received from said another device;

wherein controlling synchronisation of the data is one or more of, causing the data to be removed from the first device, causing the data to be restored to the first device, causing the data to be encrypted on the first device, and causing the data to be decrypted on the first device; and wherein the data to be removed, restored, encrypted, or decrypted is dependent on one of the location of the first device and the time at the location of the first device.

* * * * *